United States Patent
Hirai et al.

(10) Patent No.: US 9,899,674 B2
(45) Date of Patent: Feb. 20, 2018

(54) POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

(71) Applicant: NISSAN MOTOR CO., LTD., Yokohama-shi, Kanagawa (JP)

(72) Inventors: Tamaki Hirai, Yokohama (JP); Manabu Kaseda, Yokohama (JP); Osamu Shimamura, Yokohama (JP); Kenji Ohara, Yokohama (JP); Kousuke Hagiyama, Yokohama (JP); Fumihiro Kawamura, Yokosuka (JP); Masanori Aoyagi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 18 days.

(21) Appl. No.: 14/771,017

(22) PCT Filed: Feb. 27, 2014

(86) PCT No.: PCT/JP2014/054841
§ 371 (c)(1),
(2) Date: Aug. 27, 2015

(87) PCT Pub. No.: WO2014/133069
PCT Pub. Date: Sep. 4, 2014

(65) Prior Publication Data
US 2016/0013486 A1    Jan. 14, 2016

(30) Foreign Application Priority Data
Feb. 28, 2013 (JP) ................................. 2013-040109

(51) Int. Cl.
*H01M 4/131* (2010.01)
*H01M 4/505* (2010.01)
(Continued)

(52) U.S. Cl.
CPC .......... *H01M 4/505* (2013.01); *C01G 53/006* (2013.01); *C01G 53/50* (2013.01); *H01M 2/16* (2013.01);
(Continued)

(58) Field of Classification Search
CPC ...... H01M 4/131; H01M 4/366; H01M 4/505; H01M 4/525; H01M 2004/028; H01M 2004/021; H01M 204/021; Y02E 60/122
See application file for complete search history.

(56) References Cited

U.S. PATENT DOCUMENTS

2004/0110063 A1* 6/2004 Uchitomi ............... C01G 53/50 429/223
2005/0069758 A1 3/2005 Kitao et al.
(Continued)

FOREIGN PATENT DOCUMENTS

CN   101090163 A   12/2007
EP   2 403 041 A1   1/2012
(Continued)

OTHER PUBLICATIONS

Mavhine translation of JP 2002-270245, retrieved from <https://www.j-platpat.inpit.go.jp/web/all/top/BTmTopEnglishPage> on Oct. 26, 2016.*
(Continued)

*Primary Examiner* — Cynthia K Walls
(74) *Attorney, Agent, or Firm* — Foley & Lardner LLP

(57) ABSTRACT

[Object] Provided is a means which is capable, with respect to a non-aqueous electrolyte secondary battery, of suppressing a decrease in capacity when the battery is used for a long period of time, and improving cycle characteristics.

(Continued)

[Solving Means] Provided is a positive electrode active substance for a non-aqueous electrolyte secondary battery, the positive electrode active substance being a lithium-nickel-manganese-cobalt composite oxide and having true density of 4.40 to 4.80 g/cm$^3$.

7 Claims, 3 Drawing Sheets

(51) Int. Cl.
*H01M 2/16* (2006.01)
*H01M 4/525* (2010.01)
*H01M 10/052* (2010.01)
*C01G 53/00* (2006.01)
*H01M 4/36* (2006.01)
*H01M 10/0525* (2010.01)
*H01M 4/1391* (2010.01)
*H01M 4/02* (2006.01)

(52) U.S. Cl.
CPC ......... *H01M 4/131* (2013.01); *H01M 4/1391* (2013.01); *H01M 4/366* (2013.01); *H01M 4/525* (2013.01); *H01M 10/052* (2013.01); *H01M 10/0525* (2013.01); *C01P 2002/50* (2013.01); *C01P 2002/52* (2013.01); *C01P 2004/10* (2013.01); *C01P 2004/20* (2013.01); *C01P 2004/32* (2013.01); *C01P 2004/38* (2013.01); *C01P 2004/39* (2013.01); *C01P 2004/61* (2013.01); *C01P 2004/84* (2013.01); *C01P 2006/10* (2013.01); *C01P 2006/12* (2013.01); *H01M 2004/021* (2013.01); *H01M 2004/028* (2013.01); *Y02T 10/7011* (2013.01)

(56) References Cited

U.S. PATENT DOCUMENTS

| | | | |
|---|---|---|---|
| 2005/0158546 A1* | 7/2005 | Shizuka | H01M 4/0404 428/402 |
| 2006/0019154 A1* | 1/2006 | Imachi | H01M 2/1653 429/144 |
| 2006/0057466 A1 | 3/2006 | Suhara et al. | |
| 2007/0292756 A1 | 12/2007 | Tsuchiya | |
| 2009/0239146 A1 | 9/2009 | Nakagawa et al. | |
| 2011/0052991 A1 | 3/2011 | Kim et al. | |
| 2011/0171529 A1 | 7/2011 | Kono et al. | |
| 2011/0256437 A1 | 10/2011 | Katsuki et al. | |
| 2013/0045421 A1 | 2/2013 | Kobino et al. | |

FOREIGN PATENT DOCUMENTS

| | | | |
|---|---|---|---|
| EP | 2 963 708 A1 | 1/2016 | |
| JP | 2001-085006 A | 3/2001 | |
| JP | 2002-270245 | * 9/2002 | ............ H01M 10/40 |
| JP | 2005-129492 A | 5/2005 | |
| JP | 2007-213866 A | 8/2007 | |
| JP | 2008-115075 A | 5/2008 | |
| JP | 2010-050079 A | 3/2010 | |
| JP | 2011-105588 A | 6/2011 | |
| JP | 2011-526732 A | 10/2011 | |
| JP | 2011-228073 A | 11/2011 | |
| JP | 2012-094406 A | 5/2012 | |
| KR | 10-2006-0113354 A | 11/2006 | |
| KR | 10-2007-0021041 A | 2/2007 | |
| KR | 10-2009-0082790 A | 7/2009 | |
| KR | 10-2011-0049861 A | 5/2011 | |
| WO | WO 2010/053058 A1 | 5/2010 | |
| WO | WO 2010/116839 A1 | 10/2010 | |

OTHER PUBLICATIONS

Liu (CuO-coated Li[Ni0.5Co0.2Mn0.3]02 cathode material with improved cycling performance at high rates, Electrochimica Acta, 85 (2012) 605-611).*

U.S. Appl. No. 14/771,000, filed Aug. 27, 2015, Nissan Motor Co., Ltd.

U.S. Appl. No. 14/771,106, filed Aug. 27, 2015, Nissan Motor Co., Ltd.

* cited by examiner

POSITIVE ELECTRODE ACTIVE SUBSTANCE, POSITIVE ELECTRODE MATERIAL, POSITIVE ELECTRODE, AND NON-AQUEOUS ELECTROLYTE SECONDARY BATTERY

TECHNICAL FIELD

The present invention relates to a positive electrode active substance, a positive electrode material, a positive electrode, and a non-aqueous electrolyte secondary battery.

BACKGROUND ART

Currently, a non-aqueous electrolyte secondary battery including a lithium ion secondary battery, which is used for a mobile device such as a mobile phone, is available as a commercial product. The non-aqueous electrolyte secondary battery generally has a constitution that a positive electrode having a positive electrode active substance or the like coated on a current collector and a negative electrode having a negative electrode active substance or the like coated on a current collector are connected to each other via an electrolyte layer in which a non-aqueous electrolyte solution or a non-electrolyte gel is maintained within a separator. According to absorption and desorption of ions such as lithium ions on an electrode active substance, charging and discharging reactions of a battery occur.

In recent years, it is desired to reduce the amount of carbon dioxide in order to cope with the global warming. As such, a non-aqueous electrolyte secondary battery having small environmental burden has been used not only for a mobile device but also for a power source device of an electric vehicle such as a hybrid vehicle (HEV), an electric vehicle (EV), or a fuel cell vehicle.

As the non-aqueous electrolyte secondary battery for application to an electric vehicle, it is required to have high output and high capacity. As a positive electrode active substance used for the positive electrode of a non-aqueous electrolyte secondary battery for an electric vehicle, a lithium cobalt composite oxide, which is a layered composite oxide, has been already widely used since it can provide high voltage at the level of 4 V and has high energy density. However, due to resource scarcity, cobalt as a raw material is expensive, and considering the possibility of having dramatic demand in future, it is not stable in terms of supply of a raw material. There is also a possibility of having an increase in the raw material cost of cobalt. Accordingly, a composite oxide having less cobalt content ratio is desired.

Similarly to the lithium cobalt composite oxide, a lithium nickel composite oxide has a layered structure but is less expensive than the lithium cobalt composite oxide. Furthermore, it is almost equivalent to the lithium cobalt composite oxide in terms of theoretical discharge capacity. From this point of view, it is expected that a lithium nickel composite oxide is used for constituting a battery with high capacity for practical use.

According to a lithium ion secondary battery in which a lithium nickel composite oxide is used for a positive electrode active substance, charging and discharging are performed as a result of desorption and insertion of lithium ions from and to the nickel composite oxide. At that time, since the composite oxide undergoes shrinkage and expansion in conjunction with the desorption and insertion of lithium ions, a great decrease in capacity occurs in accordance with repeated charge and discharge cycles as caused by a factor such as the collapse of the crystal structure. Thus, there is a problem in that a decrease in capacity becomes significant when the battery is used for a long period of time.

In view of the aforementioned problems, for example, JP 2001-85006 A is characterized in that a technique of having relatively large primary particles for forming secondary particles in a lithium nickel composite oxide is suggested for the purpose of improving discharge capacity and cycle characteristics.

SUMMARY OF THE INVENTION

Technical Problem

However, even with the technique described in JP 2001-85006 A, the improvement of cycle characteristics was not sufficient.

Under the circumstances, an object of the present invention is to provide, with respect to a non-aqueous electrolyte secondary battery, there is provided a means capable of suppressing a decrease in capacity when the battery is used for a long period of time, thus improving cycle characteristics.

Solution to Problem

The inventors of the present invention conducted intensive studies. As a result, they found that true density is set within a specific range in a lithium-nickel-manganese-cobalt composite oxide as a positive electrode active substance for a non-aqueous electrolyte secondary battery and thus the aforementioned problems can be solved.

DESCRIPTION OF EMBODIMENTS

Figure 1A:
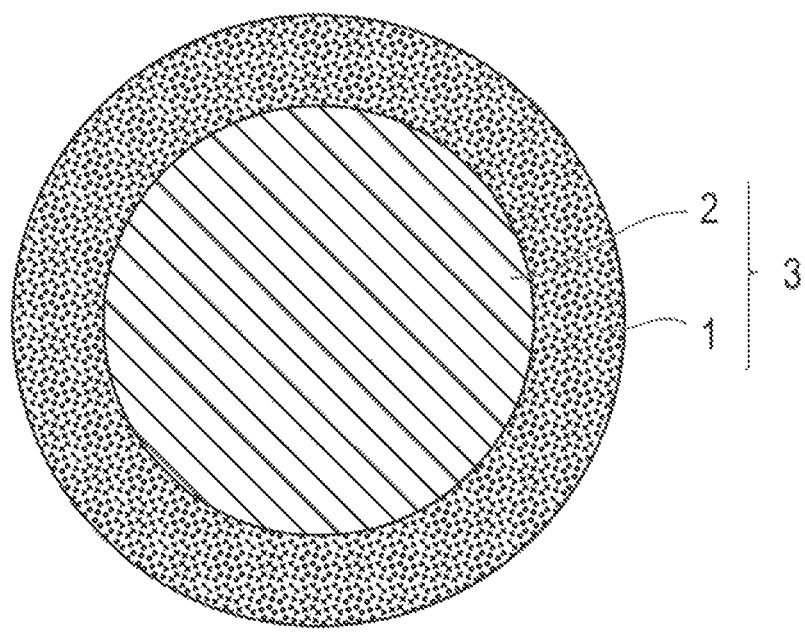
FIG. 1A is a cross-sectional view schematically illustrating one embodiment of a core-shell type positive electrode material.

A first embodiment of the present invention relates to a positive electrode active substance for a non-aqueous electrolyte secondary battery that is a lithium-nickel-manganese-cobalt composite oxide, the true density being 4.40 to 4.80 g/cm$^3$. Preferably, the present invention further relates to a positive electrode active substance for a non-aqueous electrolyte secondary battery with a specific surface area of 0.30 to 1.0 m$^2$/g.

The lithium-nickel-manganese-cobalt composite oxide (hereinafter, also simply referred to as a "NMC composite oxide") has a layered crystal structure in which a lithium atom layer and a transition metal (Mn, Ni, and Co are arranged with regularity) atom layer are alternately stacked via an oxygen atom layer, one Li atom is included per atom of transition metal M and an extractable Li amount is twice the amount of spinel lithium manganese oxide, that is, the supply power is two times higher, and thus it can have high capacity. In addition, as having higher heat stability compared to LiNiO$_2$, t is particularly advantageous among the nickel composite oxides that are used as a positive electrode active substance.

In a composite oxide containing nickel, however, shrinkage-expansion of the composite oxide occurs in conjunction with desorption and insertion of lithium ions when charging and discharging are performed according to desorption and insertion of lithium ions. As such, there have been problems that a great decrease in capacity occurs in accordance with repeated charge/discharge cycles as caused by a factor such as the collapse of the crystal structure, and a decrease in capacity (decrease in cycle characteristics) becomes significant when the battery is used for a long period of time.

Such decrease in cycle characteristics becomes more significant in a battery with layered structure, in particular, a battery installed in an automobile. Since the battery with layered structure, in particular, a battery installed in an automobile, has generally a large size unlike a battery used for a mobile phone or a mobile personal computer, there is a concern regarding an occurrence of huge temperature difference between inside and outside thereof. In a battery with layered structure, the inside of the battery in a layered direction is most prone to temperature increase and it is believed that the temperature thereof decreases toward the end part due to heat discharge through an outer case. The positive electrode material having a layered rock salt structure such as an NMC composite oxide has temperature dependency of the reaction so that the crystal structure is easily collapsed in accordance with temperature increase. In this regard, it is believed that, in accordance with easy insertion and desorption of lithium ions according to temperature increase, frequency of the shrinkage and expansion of a composite oxide is increased. Namely, as the temperature unevenness easily occurs in a layered direction, the unevenness in a degree of expansion and shrinkage of a positive electrode material also occurs in a layered type battery. When a battery is used for a long period of time, peeling of particles may easily occur in an area with high temperature load due to shrinkage and expansion of the material of a positive electrode active substance. Accordingly, it is believed that a decrease in battery capacity is yielded.

Furthermore, when such a composite oxide is applied to a non-aqueous electrolyte secondary battery, in particular, a battery installed in an automobile, significantly longer service life of the secondary battery is required as compared with the case of the application for electric and mobile electronic devices of a related art. For traditional use in electric and mobile electronic devices, for example, about 500 cycles may be sufficient to the most. However, for a battery installed in an automobile, it is necessary to maintain capacity at certain level or above even at a cycle number of 1000 to 1500 cycles. Studies have not been made sufficiently regarding a NMC composite oxide that can endure such long term cycle.

In addition, when the non-aqueous electrolyte secondary battery is used as a power source of an automobile or the like, it is required to have a high volume energy density to further increase a cruising distance.

While keeping in mind the battery for an automobile which is involved with such strict requirements, the inventors of the present invention conducted studies on the NMC composite oxide that can be used for a secondary battery with high volume energy density while improving cycle characteristics.

As a result, it was found that the true density of a positive electrode active substance plays an important role in those performances, and among them, it was also found that the NMC composite oxide having the true density within a specific range has excellent cycle characteristics and high volume energy density.

Although the accurate working mechanism remains unclear, it is believed as follows. As the true density is 4.80 g/cm$^3$ or less, suitable pores are present within a positive electrode active substance so that a deformation of a structure which is caused by expansion and shrinkage accompanying a charge and discharge cycle can be inhibited, and thus the aforementioned effect is exhibited. It is also believed that, as the true density is 4.40 g/cm$^3$ or more, suitable adhesion is caused between active substances so that the volume energy density is enhanced.

According to the positive electrode active substance for a non-aqueous electrolyte secondary battery of the present invention, suitable pores are present within an active substance so that a deformation of a structure which is caused by expansion and shrinkage accompanying a charge and discharge cycle can be inhibited. Accordingly, it is believed that peeling of particles caused by expansion and shrinkage in an area with high temperature load can be suppressed, and a non-aqueous electrolyte secondary battery which exhibits a little decrease in capacity and has excellent cycle characteristics even when used for a long period of time can be obtained. As such, even for a battery premised on the use for a long period of time like a layered-structure type battery for an automobile, a decrease in capacity caused by use for a long period of time is inhibited.

Furthermore, the positive electrode active substance of the present invention preferably has a specific surface area of 0.30 to 1.0 m$^2$/g. As the active substance has a specific surface area within this range, the reaction area of an active substance is ensured to show low internal resistance of a battery. Accordingly, an occurrence of polarization is suppressed to minimum level at the time of an electrode reaction. Since side reactions such as decomposition of an electrolyte solution and oxidative decomposition on a surface of an electrode material occur in accordance with an occurrence of polarization, it is preferable to suppress an occurrence of polarization to minimum level. More preferably, the specific surface area is 0.30 to 0.70 m$^2$/g.

The values measured by the method described in the following Examples are used as values of specific surface area and true density.

The NMC composite oxide of the present invention also includes a composite oxide in which part of transition metal elements are replaced with other metal element. In that case, examples of other elements include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

Due to high theoretical discharge capacity, the lithium-nickel-manganese-cobalt composite oxide is preferably represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and b+c+d=1. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0<x\leq0.3$ in General Formula (1), in particular. By dissolving at least one selected from a group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

With regard to the NMC composite oxide, the inventors of the present invention found that the influence of deformation/cracking of the composite oxide during charge and discharge described above becomes higher if the metal composition of nickel, manganese and cobalt is heterogeneous such as $LiNi_{0.5}Ni_{0.3}Co_{0.2}O_2$. This is believed that, as the metal composition is heterogeneous, a deformation is caused in stress applied to the inside of particle during expansion and shrinking so that cracks are more easily generated in the composite oxide. Thus, when comparison is made with the composite oxide having a rich Ni abundance ratio (for example, $LiNi_{0.8}Mn_{0.1}Co_{0.1}O_2$) or a composite oxide with a homogenous abundance ratio of Ni, Mn and Co (for example, $LiNi_{0.3}Mn_{0.3}Co_{0.3}O_2$), a more significant decrease in long-term cycle characteristics is yielded. It was found in the present invention that a decrease in the cycle characteristics is surprisingly suppressed by using a composite oxide with specific true density even for a composite oxide having a heterogeneous metal composition like $LiNi_{0.5}Mn_{0.3}Co_{0.2}O_2$.

Thus, the positive electrode active substance with the composite oxide in which b, c, and d of General Formula (1) satisfy $0.44 \leq b \leq 0.51$, $0.27 \leq c \leq 0.31$, and $0.19 \leq d \leq 0.26$ is preferable in that the effect of the present invention is obtained at significant level.

In the positive electrode active substance of the present invention, the secondary particles are formed by aggregation of the primary particles. Among the secondary particles, pores are present between primary particles. In the present invention, from the viewpoint of the cycle characteristics and volume energy density, the porosity in the secondary particles is preferably 2% or more and less than 10%. As described herein, the porosity indicates the area ratio of pore part to the total area of primary particle part and pore part on a cross-section of a secondary particle.

From the viewpoint of obtaining high output, the average particle diameter of the positive electrode active substance is, although not particularly limited, preferably 6 to 11 µm, and more preferably 7 to 10 µm in terms of the particle diameter of secondary particle. Furthermore, the average particle diameter of primary particles is 0.40 to 0.65 µm, and more preferably 0.45 to 0.55 µm. Meanwhile, in the specification, the "particle diameter" means the maximum distance L among the distances between any two points on a contour line of the particle. Furthermore, as for the value of "average particle diameter", it is obtained as follows: an observation means such as a scanning type electron microscope (SEM) and a transmission type electron microscope (TEM) is used and the average particle diameter is calculated by averaging several to several tens of the particles that are observed within an observation range.

The NMC composite oxide of the present invention can be produced by selecting various known methods such as a co-precipitation method and a spray drying method. From the viewpoint of having easy production of the composite oxide of the present invention, a co-precipitation method is preferably used. Specifically, production can be made by the method as described in JP 2011-105588 A (corresponding to US 2013/045421 A) in which a nickel-cobalt-manganese composite oxide is produced by the co-precipitation method and the nickel-cobalt-manganese composite oxide is admixed with a lithium compound followed by calcination.

Specific descriptions are given hereinbelow.

A raw material compound of the composite oxide, for example, a Ni compound, a Mn compound or a Co compound, is dissolved in a suitable solvent such as water so as to have a desired composition of an active substance material. Examples of the Ni compound, the Mn compound and the Co compound include sulfate, nitrate, carbonate, acetate, oxalate, oxide, hydroxide, and halide of the metal element. Specific examples of the Ni compound, the Mn compound and the Co compound include nickel sulfate, cobalt sulfate, manganese sulfate, nickel acetate, cobalt acetate, and manganese acetate, but not limited thereto. During the process, if necessary, in order to have a desired composition of an active substance material, a compound containing at least one metal element such as Ti, Zr, Nb, W, P, Al, Mg, V, Ca, Sr or Cr as a metal element for replacing the part of the layered lithium metal composite oxide which forms the active substance material may be further incorporated.

The co-precipitation reaction can be performed by neutralization and precipitation reactions using the above raw material compound and an alkali solution. Accordingly, metal composite hydroxide or metal composite carbonate containing the metal included in the above raw material compound can be obtained. As the alkali solution, an aqueous solution of sodium hydroxide, potassium hydroxide, sodium carbonate, ammonia and so on can be used. For the neutralization reaction, it is preferable to use sodium hydroxide, sodium carbonate, or a mixture solution thereof. In addition, it is preferable to use an aqueous ammonia solution or ammonia salt for a complex reaction.

The addition amount of the alkali solution used for neutralization reaction is sufficient to have the equivalent ratio of 1.0 to components to be neutralized which are included in the whole metal salts. However, for having pH control, it is preferably added together with an excess alkali amount.

The aqueous ammonia solution or ammonia salt used for a complex reaction is preferably added such that the ammonia concentration in the reaction solution is in a range of 0.01 to 2.00 mol/l. The pH of the reaction solution is preferably controlled in a range of 10.0 to 13.0. The reaction temperature is preferably 30° C. or higher, and more preferably 30 to 60° C.

The composite hydroxide obtained by co-precipitation reaction is then preferably filtered by suction, washed with water, and dried.

Subsequently, by mixing and calcining nickel-cobalt-manganese composite hydroxide with a lithium compound, the lithium-nickel-manganese-cobalt composite oxide can be obtained. Examples of the Li compound include lithium hydroxide or a hydrate thereof, lithium peroxide, lithium nitrate and lithium carbonate.

The calcination treatment is preferably performed by two steps (temporary calcination and main calcination). According to two-step calcination, a composite oxide can be obtained efficiently. The conditions for temporary calcination are not particularly limited, and the temperature increase rate is preferably 1 to 20° C./minute from room temperature. Furthermore, the atmosphere is preferably either air or oxygen atmosphere. Further, the temperature for calcination is preferably 700 to 1000° C., and more preferably 650 to 750° C. Furthermore, the time for calcination is preferably 3 to 20 hours and more preferably 4 to 6 hours. Meanwhile, as for the conditions for main calcination, the temperature increase rate is preferably 1 to 20° C./minute from room temperature, although it is not particularly limited thereto. Furthermore, the atmosphere is preferably either air or oxygen atmosphere. Furthermore, the temperature for calcination is preferably 700 to 1000° C. and more preferably 850 to 1100° C. Furthermore, the time for calcination is preferably 3 to 20 hours and more preferably 8 to 12 hours.

When a tiny amount of a metal element for replacing part of the layered lithium metal composite oxide constituting an active substance material is added as needed, any means such as mixing it in advance with nickel, cobalt, manganate salt, adding it simultaneously with nickel, cobalt, lithium manganate salt, adding it to a reaction solution during the reaction, or adding it to the nickel-cobalt-manganese composite oxide with a Li compound can be employed.

The composite oxide of the present invention can be produced by suitably controlling the reaction conditions such as a pH of a reaction solution, reaction temperature, reaction concentration, addition rate, stirring power, and stirring rate.

A second embodiment of the present invention is a core-shell type positive electrode material which has a core part containing the positive electrode active substance according to the first embodiment and a shell part containing a lithium metal-based composite oxide that is different from the positive electrode active substance.

Figure 1B:
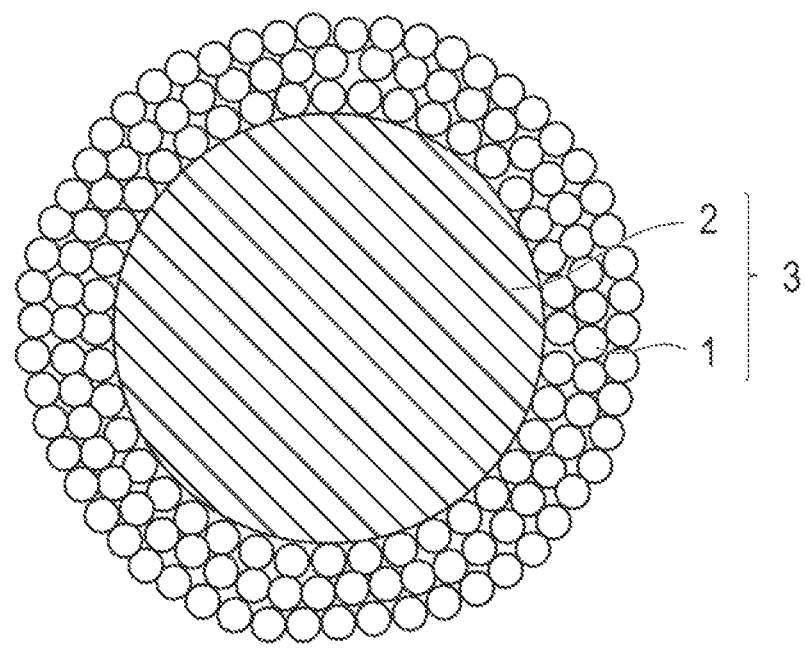
FIG. 1B is a cross-sectional view schematically illustrating another embodiment of a core-shell type positive electrode material.

FIG. 1A is a schematic cross-sectional view of active substance particles as one embodiment of the core-shell type positive electrode material, in which the inside of the particles has a structure of the core-shell type structure due to different active substance materials. In FIG. 1A and FIG. 1B, 1 indicates a shell part of a positive electrode material, 2 indicates a core part of a positive electrode material, and 3 indicates a positive electrode material. With this core-shell structure, cycle characteristics of a non-aqueous electrolyte secondary battery are further improved. According to the study by the inventors of the present invention, it was confirmed that only the particle surface layer part has a reduction in Ni valency, as a result of analyzing the NMC composite oxide particles after cycle durability test. Based on this, the inventors of the present invention made a presumption that, as Ni on particle surface layer part is inactivated, it actually may not contribute to charge and discharge. Subsequently, it was assumed that further improvement of the cycle characteristics can be obtained by having the NMC composite oxide with low Ni concentration or a material other than Ni on a topical area prone to deterioration, and it was consequently proven.

The core part can be a single layer (monolayer) or has a constitution of two or more layers. Examples of the embodiment in which the core part is composed of two or more layers include (1) a structure in which plural layers are stacked, from a surface to a center of a core part, in concentric circle shape and (2) a structure in which content varies continuously from a surface to a center of a core part.

In those cases, by modifying the material for each layer or modifying the mixing ratio of two or more active substance materials, a change (functional gradient) can be made such that performances such as capacity or output increase or decrease from a surface to a center of the core part. Furthermore, the present invention may include production by a granulation technique using two or more materials. For example, (3) a sea-island structure in which different materials are sprinkled in an island shape within a matrix material is also possible. It can be also (4) a structure in which different materials are present on a hemisphere part of core particles. It can be also (5) a secondary particle (aggregated) structure in which groups of microparticles consisting of different materials are put together and granulated by solidification. It can be also a structure in which the above (1) to (5) are suitably combined. From the viewpoint of the easy production, and lowering the number of kinds of material and production steps (lowering the cost for material and production), it is preferable to have a single layer (monolayer) constitution.

The shape of the core part may be, although not particularly limited, a circle shape, a cubic shape, a rectangle shape, an ellipsoid shape, a needle shape, a plate shape, a prism shape, a column shape, and an amorphous shape. It is preferably a sphere shape or an ellipsoid shape.

The shell part may be formed on an outer side (outer layer) of a core part, and it may be a single layer (monolayer) or has a constitution of two or more layers.

Furthermore, the shell part is not limited to the form in which it covers the entire core part, and it may coat only part of the core part (a composite oxide of a shell part is sprinkled on a surface of a composite oxide of a core part and part of the surface of the core part may remain exposed).

Furthermore, the shell part may be present in a layered form so as to coat the entire surface of the core part (see, FIG. 1A), or it may be present to cover (impregnate) the entire surface of the core part by using plural microparticles (powders) (see, FIG. 1B).

Examples of the embodiment of preparing the shell part to have two or more layers include the structures (1) to (5) that are described above for the core part.

The lithium composite oxide contained in a shell part is not particularly limited if it is the lithium metal composite oxide which is different from the aforementioned positive electrode active substance according to the first embodiment. Specific examples thereof include lithium manganate of a spinel structure such as $LiMn_2O_4$, lithium manganate such as $LiMnO_2$ and $Li_2MnO_3$, a lithium-nickel-manganese-cobalt composite oxide having a composition different from the positive electrode active substance according to the first embodiment, lithium cobalt acid such as $LiCoO_2$, lithium nickel acid such as $LiNiO_2$, lithium iron oxide such as $LiFeO_2$, and lithium iron phosphate such as $LiFePO_4$. Among them, from the viewpoint of the cycle characteristics, a lithium-nickel-manganese-cobalt composite oxide having a composition different from the positive electrode active substance according to the first embodiment, lithium nickel acid, or a manganese positive electrode active substance of spinel type is preferable. More preferably, it is a lithium-nickel-manganese-cobalt composite oxide having a composition different from the positive electrode active substance according to the first embodiment (preferably, it is represented by General Formula (2): $Li_{a'}Ni_{b'}Co_{c'}Mn_{d'}M_{x'}O_2$ (with the proviso that, in the formula, a', b', c', d', and x' satisfy $0.9 \leq a' \leq 1.2$, $0 < b' < 1$, $0 < c' \leq 0.5$, $0 < d' \leq 0.5$, $0 \leq x' \leq 0.3$, and b+c+d=1. M includes at least one element selected from Ti, Zr, Nb, W, P, Al, Mg, V, Ca, and Sr)).

Furthermore, the positive electrode active substance contained in the core part is preferably the composite oxide in which b, c and d of General Formula (1) are as follows: $0.44 \leq b \leq 0.51$, $0.27 \leq c \leq 0.31$, $0.19 \leq d \leq 0.26$, and the composite oxide contained in the shell part is preferably the lithium-nickel-manganese-cobalt composite oxide having a composition different from the positive electrode active substance according to the first embodiment.

Regarding the composite oxide contained in the shell part, it is preferable to have $0.3 \leq b' \leq 0.45$ in General Formula (2). As the lithium-nickel-manganese-cobalt composite oxide with this composition is preferable in that it has improved cycle characteristics and also excellent thermal stability (high exothermic onset temperature) while having a decrease in capacity kept at minimum level.

The composite oxide contained in the shell part may be used alone, or may be used with mixing two or more kinds. When the shell part is composed of two or more layers, a single type of an active substance material may be used for each layer, or two or more materials may be mixed and used for each layer.

In a positive electrode material with such core-shell type structure, the shell part is preferably 5 to 20% by weight and more preferably 1 to 15% by weight relative to 100% by weight of the core part.

Furthermore, the core-shell type positive electrode material preferably satisfies at least one of (1) true density of 4.40 to 4.80 g/cm$^3$ and (2) specific surface area of 0.30 to 1.0 m$^2$/g. More preferably, it satisfies both of (1) and (2).

Meanwhile, the core-shell type positive electrode active substance can be produced according to a method described in JP 2007-213866 A.

A third embodiment of the present invention relates to a positive electrode material containing the positive electrode active substance of the first embodiment and a spinel type manganese positive electrode active substance. The inventors of the present invention found that the NMC composite oxide has a problem that voltage lowering is great during high output discharge at low temperature, and for example, insufficient output of an automobile in a cold region occurs. In this connection, it was found that, by mixing the NMC composite oxide with a spinel type manganese positive electrode active substance, voltage lowering during high output discharge at low temperature is reduced and also insufficient output of an automobile in a cold region is improved.

The mixing weight ratio of the positive electrode active substance of the first embodiment to spinel type manganese positive electrode active substance is, from the viewpoint of the cycle characteristics, preferably as follows: positive electrode active substance of the first embodiment:spinel type manganese positive electrode active substance=50:50 to 90:10. From the viewpoint of the balance in capacity, service life, and heat stability, it is more preferably 70:30 to 90:10.

The positive electrode material of the third embodiment preferably satisfies at least one of (1) true density of 4.40 to 4.80 g/cm$^3$ and (2) specific surface area of 0.30 to 1.0 m$^2$/g. More preferably, it satisfies both of (1) and (2).

According to another embodiment of the present invention, a positive electrode obtained by forming, on a surface of a positive electrode current collector, a layer of a positive electrode active substance containing at least one selected from a group consisting of the positive electrode active substance of the first embodiment, the positive electrode material of the second embodiment, and the positive electrode material of the third embodiment is provided.

Meanwhile, it is needless to say that the positive electrode can contain other positive electrode active substance which plays a role of an active substance. At least one selected from a group consisting of the positive electrode active substance of the first embodiment, the positive electrode material of the second embodiment, and the positive electrode material of the third embodiment is preferably 80 to 100% by weight, more preferably 95 to 100% by weight, and even more preferably 100% by weight relative to 100% by weight of the positive electrode active substance.

If necessary, the positive electrode active substance layer further contains other additives such as a conductive aid, a binder, an electrolyte (for example, polymer matrix, ion conductive polymer, and electrolyte solution), and lithium salt for enhancing ion conductivity in addition to the active substance.

The content of the positive electrode active substance is preferably 85 to 99.5% by weight in the positive electrode active substance layer.

(Binder)

A binder used for the positive electrode active substance layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the positive electrode active substance layer is not particularly limited as long as the binder can bind the active substance. The amount of binder is preferably 0.5 to 15% by weight, more preferably 1 to 10% by weight with respect to the active substance layer.

If necessary, the positive electrode active substance layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active substance layer or negative electrode active substance layer. Examples of the conductive aid include carbon materials such as carbon black including ketjen black and acetylene black; graphite; and carbon fiber. When the active substance layer contains a conductive aid, an electron network in the inside of the active substance layer is formed effectively, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the positive electrode active substance layer and negative electrode active substance layer described below is not particularly limited. The blending ratio can be adjusted by suitably referring to the already-known knowledge about a lithium ion secondary battery. The thickness of each active substance layer is not particularly limited either, and reference can be made to the already-known knowledge about a battery. For example, the thickness of each active substance layer is about 2 to 100 μm.

According to still another embodiment of the present invention, a non-aqueous electrolyte secondary battery having a power generating element including the aforementioned positive electrode, a negative electrode obtained by forming a negative electrode active substance layer on a surface of a negative electrode current collector, and a separator can be provided.

Next, a description will be made of a non-aqueous electrolyte lithium ion secondary battery as a preferred embodiment of the non-aqueous electrolyte secondary battery, but it is not limited thereto. Meanwhile, the same elements are given with the same symbols for the descriptions of the drawings, and overlapped descriptions are omitted. Further, note that dimensional ratios in the drawings are exaggerated for the sake of description, and are different from actual ratios in some cases.

Figure 2:
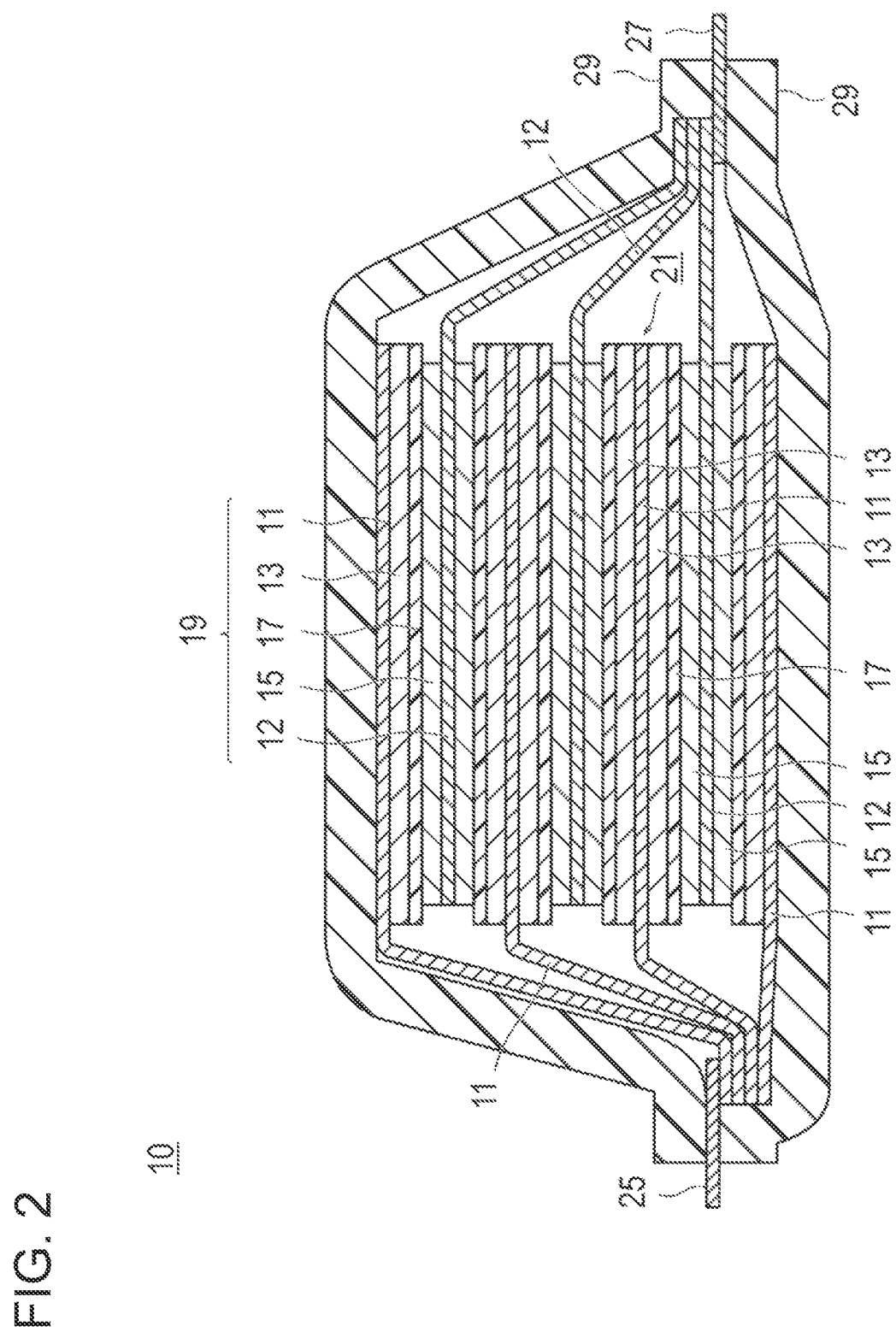
FIG. 2 is a cross-sectional view schematically illustrating the basic constitution of a non-aqueous electrolyte lithium ion secondary battery as one embodiment of the non-aqueous electrolyte lithium ion secondary battery, in which the non-aqueous electrolyte lithium ion secondary battery is a flat type (stack type), and not a bipolar type.

FIG. 2 is a cross-sectional view schematically illustrating the basic constitution of a non-aqueous electrolyte lithium ion secondary battery which is not a bipolar type of a flat type (stack type) (hereinbelow, it is also simply referred to as a "stack type battery"). As illustrated in FIG. 2, the stack type battery 10 according to this embodiment has a structure in which a power generating element 21 with a substantially rectangular shape, in which a charge and discharge reaction actually occurs, is sealed inside of a battery outer casing material 29 as an outer casing body. Herein, the power generating element 21 has a constitution in which a positive electrode, the separator 17, and a negative electrode are stacked. Meanwhile, the separator 17 has a non-aqueous electrolyte (for example, liquid electrolyte) within it. The positive electrode has a structure in which the positive electrode active substance layer 15 is disposed on both surfaces of the positive electrode current collector 12. The negative electrode has a structure in which the negative electrode active substance layer 13 is disposed on both surfaces of the negative electrode current collector 11. Specifically, one positive electrode active substance layer 15 and the neighboring negative electrode active substance layer 13 are disposed to face each other via the separator 17, and the negative electrode, the electrolyte layer and the positive electrode are stacked in this order. Accordingly, the neighboring positive electrode, electrolyte layer and negative electrode form one single battery layer 19. As such, it can be also said that, as plural single battery layers 19 are stacked, the stack type battery 10 illustrated in FIG. 2 has a constitution in which electrically parallel connection is made among them.

Meanwhile, on the outermost layer negative electrode current collector which is present on both outermost layers of the power generating element 21, the negative electrode active substance layer 13 is disposed only on a single surface. However, an active substance layer may be formed on both surfaces. Namely, not only a current collector exclusive for an outermost layer in which an active substance layer is formed on a single surface can be achieved but also a current collector having an active substance layer on both surfaces can be directly used as a current collector of an outermost layer. Furthermore, by reversing the arrangement of the positive electrode and negative electrode of FIG. 2, it is also possible that the outermost layer positive electrode current collector is disposed on both outermost layers of the power generating element 21 and a positive electrode active substance layer is disposed on a single surface or both surfaces of the same outermost layer positive electrode current collector.

The positive electrode current collector 12 and negative electrode current collector 11 have a structure in which each of the positive electrode current collecting plate (tab) 27 and negative electrode current collecting plate (tab) 25, which conductively communicate with each electrode (positive electrode and negative electrode), is attached and inserted to the end part of the battery outer casing material 29 so as to be led to the outside of the battery outer casing material 29. If necessary, each of the positive electrode current collecting plate 27 and negative electrode current collecting plate 25 can be attached, via a positive electrode lead and negative electrode lead (not illustrated), to the positive electrode current collector 12 and negative electrode current collector 11 of each electrode by ultrasonic welding or resistance welding.

Meanwhile, although a stack type battery is illustrated in FIG. 2 instead of a bipolar type of a flat type (stack type), it can be also a bipolar type battery containing a bipolar type electrode which has a positive electrode active substance layer electrically bound to one surface of a current collector and a negative electrode active substance layer electrically bound to the opposite surface of the current collector. In that case, one current collector plays both roles of a positive electrode current collector and a negative electrode current collector.

Hereinbelow, each member is described in more detail.

[Negative Electrode Active Substance Layer]

The negative electrode active substance layer contains an active substance, and if necessary, further contains other additives such as a conductive aid, a binder, an electrolyte (for example, polymer matrix, ion conductive polymer, and electrolyte solution), and lithium salt for enhancing ion conductivity. The other additives such as a conductive aid, a binder, an electrolyte (for example, polymer matrix, ion conductive polymer, and electrolyte solution), and lithium salt for enhancing ion conductivity are the same as those described above for the positive electrode active substance layer.

The negative electrode active substance layer preferably contains at least an aqueous binder. The aqueous binder has a high binding property. Further, since water as a raw material is easily available and also only water vapor is generated during drying, there is an advantage that the investment on facilities of a production line can be greatly reduced and an environmental load can be reduced.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, a copolymer of (meth)acrylamide and/or (meth)acrylic acid salt [(meth)acrylamide polymer, (meth)acrylamide-(meth)acrylic acid salt copolymer, alkyl(meth)acrylic acid (carbon atom number of 1 to 4) ester-(meth)acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as mannan galactan derivatives. The aqueous binder can be used either singly or in combination of two or more types.

From the viewpoint of a binding property, the aqueous binder preferably contains at least one rubber-based binder selected from a group consisting of styrene-butadiene rubber, acrylonitrile-butadiene rubber, methacrylic acid methyl-butadiene rubber, and methacrylic acid methyl rubber. Further, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose (salt) are preferably combined as a binder. The weight content ratio between styrene-butadiene rubber and a water soluble polymer is, although not particularly limited, preferably as follows: styrene-butadiene rubber:water soluble polymer=1:0.1 to 10, and more preferably 1:0.5 to 2.

In a binder used for the negative electrode active substance layer, the content of the aqueous binder is preferably 80 to 100% by weight, preferably 90 to 100% by weight, and preferably 100% by weight.

Examples of the negative electrode active substance include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active substance may be used in combination. Preferably, from the viewpoint of capacity and output characteristics, a carbon material or a lithium-transition metal composite oxide is used as a negative electrode active substance. Meanwhile, it is needless to say that a negative electrode active substance other than those described above can be also used.

The average particle diameter of a negative electrode active substance is, although not particularly limited, preferably 1 to 100 μm, and more preferably 1 to 20 μm from the viewpoint of having high output.

[Separator (Electrolyte Layer)]

A separator has a function of maintaining an electrolyte to ensure lithium ion conductivity between a positive electrode and a negative electrode and also a function of a partition wall between a positive electrode and a negative electrode.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometers).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated electrolyte. Furthermore, it is sufficient that the thickness of the non-woven separator is the same as that of an electrolyte layer. Preferably, it is 5 to 200 µm. Particularly preferably, it is 10 to 100 µm.

As described above, the separator also contains an electrolyte. The electrolyte is not particularly limited if it can exhibit those functions, and a liquid electrolyte or a gel polymer electrolyte is used. By using a gel polymer electrolyte, a distance between electrodes is stabilized and an occurrence of polarization is suppressed so that the durability (cycle characteristics) is improved.

The liquid electrolyte has an activity of a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Furthermore, as a lithium salt, the compound which can be added to an active substance layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between layers is blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA) and a copolymer thereof.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

Furthermore, as a separator, a separator laminated with a heat resistant insulating layer laminated on a porous substrate (a separator having a heat resistant insulating layer) is preferable. The heat resistant insulating layer is a ceramic layer containing inorganic particles and a binder. As for the separator having a heat resistant insulating layer, those having high heat resistance, that is, melting point or heat softening point of 150° C. or higher, preferably 200° C. or higher, are used. By having a heat resistant insulating layer, internal stress in a separator which increases under temperature increase is alleviated so that the effect of inhibiting thermal shrinkage can be obtained. As a result, an occurrence of a short between electrodes of a battery can be prevented so that a battery configuration not easily allowing a performance reduction as caused by temperature increase is yielded. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating a battery.

The inorganic particles in a heat resistant insulating layer contribute to the mechanical strength or the effect of inhibiting thermal shrinkage of a heat resistant insulating layer. The material used as inorganic particles is not particularly limited. Examples thereof include oxides ($SiO_2$, $Al_2O_3$, $ZrO_2$, $TiO_2$), hydroxides and nitrides of silicon, aluminum, zirconium and titanium, and a composite thereof. The inorganic particles may be derived from mineral resources such as boehmite, zeolite, apatite, kaolin, mullite, spinel, olivine, and mica, or artificially synthesized. Furthermore, the inorganic particles may be used either singly or in combination of two or more types. From the viewpoint of the cost, it is preferable to use silica ($SiO_2$) or alumina ($Al_2O_3$) among them. It is more preferable to use alumina ($Al_2O_3$).

The weight per unit area of heat resistant particles is, although not particularly limited, preferably 5 to 15 $g/m^2$. When it is within this range, sufficient ion conductivity is obtained and heat resistant strength is maintained, and thus desirable.

The binder in a heat resistant insulating layer has a role of adhering inorganic particles or adhering inorganic particles to a porous resin substrate layer. With this binder, the heat resistant insulating layer is stably formed and peeling between a porous substrate layer and a heat resistant insulating layer is prevented.

The binder used for a heat resistant insulating layer is not particularly limited, and examples thereof which can be used include a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate. Among them, carboxymethyl cellulose (CMC), methyl acrylate, or polyvinylidene fluoride (PVDF) is preferably used. Those compounds may be used either singly or in combination of two or more types.

The content of the binder in a heat resistant insulating layer is preferably 2 to 20% by weight relative to 100% by weight of the heat resistant insulating layer. When the binder content is 2% by weight or more, the peeling strength between the heat resistant insulating layer and a porous substrate layer can be increased and vibration resistance of a separator can be enhanced. Meanwhile, when the binder content is 20% by weight or less, a gap between inorganic particles is maintained at an appropriate level so that sufficient lithium ion conductivity can be ensured.

Regarding the thermal shrinkage rate of a separator having a heat resistant insulating layer, both MD and TD are 10% or less after maintaining for 1 hour at conditions of 150° C., 2 gf/cm$^2$. By using a material with such high heat resistance, shrinkage of a separator can be effectively prevented even when the internal temperature of a battery reaches 150° C. due to increased heat generation amount from a positive electrode. As a result, an occurrence of a short between electrodes of a battery can be prevented, and thus a battery configuration not easily allowing performance reduction due to temperature increase is yielded.

[Current Collector]

The material for forming a current collector is not particularly limited, but metal is preferably used.

Specific examples of the metal include aluminum, nickel, iron, stainless, titanium, copper, and other alloys. In addition to them, a clad material of nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 µm.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 27 and the negative electrode current collecting plate 25.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

As for the battery outer casing body 29, an envelope-shaped casing to cover a power generating element, in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, an aluminate laminate is more preferred for an outer casing body.

[Cell Size]

Figure 3:
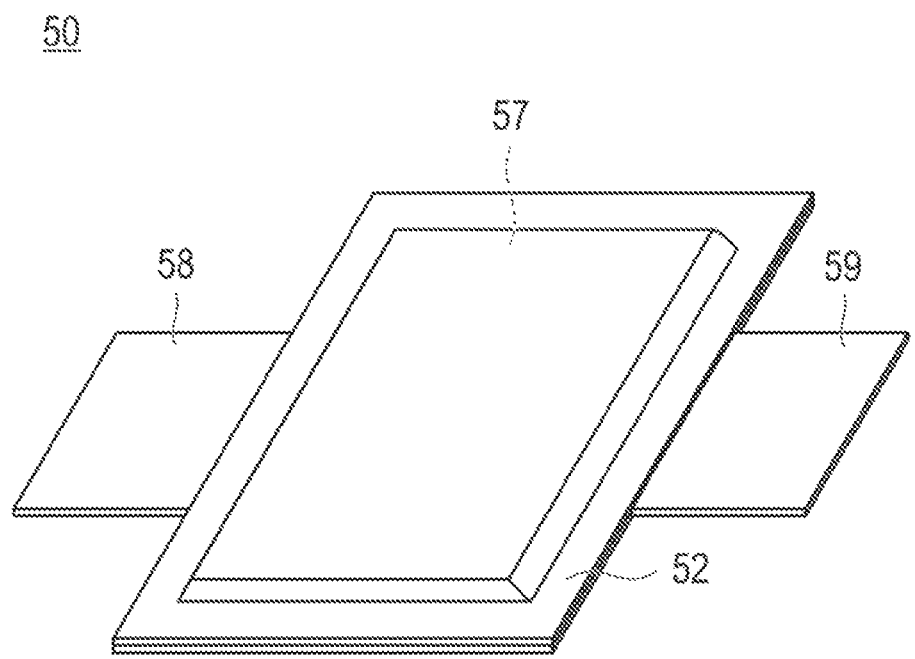
FIG. 3 is a perspective view illustrating the appearance of a flat lithium ion secondary battery as a representative embodiment of a secondary battery.

FIG. 3 is a perspective view illustrating the appearance of a flat lithium ion secondary battery as a representative embodiment of a secondary battery.

As illustrated in FIG. 3, the flat lithium ion secondary battery 50 has a flat and rectangular shape, and from both sides, the positive electrode tab 58 and the negative electrode tab 59 are drawn to extract electric power. The power generating element 57 is covered by the battery outer casing material 52 of the lithium ion secondary battery 50 with its periphery fused by heat. The power generating element 57 is sealed in a state in which the positive electrode tab 58 and the negative electrode tab 59 are led to the outside. Herein, the power generating element 57 corresponds to the power generating element 21 of the lithium ion secondary battery 10 illustrated in FIG. 2 as described above. In the power generating element 57, plural single battery layers (single cell) 19, which are each formed of the positive electrode (positive electrode active substance layer) 15, the electrolyte layer 17 and the negative electrode (negative electrode active substance layer) 13, are laminated.

Meanwhile, the lithium ion secondary battery is not limited to a flat shape of laminate type. The winding type lithium ion secondary battery may have a barrel shape or a flat and rectangular shape obtained by modifying the barrel shape, and it is not particularly limited. As an outer casing material of the barrel shape, a laminate film can be used, and a barrel can (metal can) of a related art can be used, and thus it is not particularly limited. Preferably, the power generating element is encased with an aluminum laminate film. Weight reduction can be achieved with such shape.

Furthermore, drawing of the tabs 58 and 59 illustrated in FIG. 3 is not particularly limited, either. The positive electrode tab 58 and the negative electrode tab 59 may be drawn from the same side or each of the positive electrode tab 58 and negative electrode tab 59 may be divided into plural tabs and drawn from each side, and thus it is not limited to the embodiment illustrated in FIG. 3. Furthermore, in a winding type lithium ion battery, it is also possible to form a terminal by using, for example, a barrel can (metal can) instead of a tab.

For an automobile application, a large-sized battery is demanded in these days. The effect of the present invention of increasing a cycle characteristics by inhibiting a deformation of a structure which is caused by expansion and shrinkage accompanying a charge and discharge cycle is more effectively exerted if the battery area is large. Thus, in the present invention, the battery structure of which power generating element is covered with an outer casing body preferably has a large size in view of exerting the effect of the present invention more effectively. Specifically, it is preferable that negative electrode active substance layer has a rectangle shape, and length of short side of the rectangle is 100 mm or more. Such large-size battery can be used for an automobile. Herein, the length of short side of a negative electrode active substance layer indicates the length of a shortest side in each electrode. The upper limit of a length of a short side of the battery structure is, although not particularly limited, generally 250 mm or less.

It is also possible to determine the large size of a battery in view of a relationship between battery area or battery capacity, from the viewpoint of a large-sized battery, which is different from a physical size of an electrode. For example, in the case of a flat and stack type laminate battery, for a battery with the ratio value of a battery area (projected area of a battery including an outer casing body of a battery) to rated capacity is 5 $cm^2$/Ah or more, and with rated capacity of 3 Ah or more, the battery area per unit capacity is large so that a problem of having lowered battery characteristics (cycle characteristics), which is caused by the a deformation of an active substance particle which is caused by expansion and shrinkage accompanying a charge and discharge cycle, may occur more easily. As such, the non-aqueous electrolyte secondary battery according to this embodiment is preferably a large-sized battery as described above from the viewpoint of having a larger merit obtained from exhibition of the working effects of the present invention.

Furthermore, it is also possible to determine the large size of a battery by a volume energy density or rated capacity and so on. For example, according to the market requirement, a typical electric vehicle needs to have driving distance (cruising distance) of 100 km or more per single charge. Considering such cruising distance, it is preferable that the rated capacity of the single cell is 20 Wh or more and the volume energy density of a battery is 153 Wh/L or more. Meanwhile, the volume energy density or the rated discharge capacity is determined by a method described in the below examples. Furthermore, the aspect ratio of a rectangular electrode is preferably 1 to 3, and more preferably 1 to 2. Meanwhile, the aspect ratio of an electrode is defined by longitudinal/transversal ratio of a positive electrode active substance layer with a rectangular shape. By having the aspect ratio in this range, it is preferable because gas generated in case of a charge can be uniformly discharged in the planar direction.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source or an auxiliary power source for operating a vehicle requiring high volume energy density and high volume output density, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery of the present invention can maintain discharge capacity even when it is used for a long period of time, and thus has good cycle characteristics. It also has high volume energy density. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the non-aqueous electrolyte secondary battery can be preferably used as a power source for a vehicle, for example, as a power source for operating a vehicle or as an auxiliary power source for operating a vehicle.

Specifically, the battery or an assembled battery formed by combining plural batteries can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

A description is made below in more detail in view of Examples and Comparative Examples, but the present invention is not limited to the Examples described below.

Example 1

(1) Production of Positive Electrode Active Substance

To an aqueous solution (1.0 mol/L) having nickel sulfate, cobalt sulfate, and manganese sulfate dissolved therein, sodium hydroxide and ammonia were continuously supplied to adjust the pH to 11.0, and according to a co-precipitation method, metal composite hydroxide in which nickel, cobalt, and manganese are dissolved at a molar ratio of 50:20:30 was produced.

The resulting metal composite hydroxide and lithium carbonate were weighed such that the molar ratio of the total mole number of metals (Ni, Co, Mn) other than Li to the mole number of Li is 1:1, and then thoroughly mixed. The temperature was raised at the temperature increase rate of 5° C./min, temporary calcination was performed at 900° C. for 2 hours in air atmosphere, the temperature was raised at the temperature increase rate of 3° C./min, and then main calcination was performed at 920° C. for 10 hours. After cooling to room temperature, the NMC composite oxide was obtained. The NMC composite oxide has the average primary particle diameter of 0.5 μm and the average secondary particle diameter of 10.0 μm.

Meanwhile, the true density and specific surface area of the positive electrode active substance were measured according to the following methods.

True Density:

| | |
|---|---|
| Measurement Method | Liquid phase replacement method (Pycnometer method) |
| Apparatus for measurement | Auto True Denser MAT-7000 manufactured by SEISHIN ENTERPRISE |

Co., Ltd. (values measured at measurement temperature of 25 ± 5° C. by using ethanol as a replacement medium)

Specific Surface Area:

By using Quantasorb QS-10 manufactured by Yuasa Ionics Co. Ltd., heating to 350° C. was performed for pre-drying, and after flushing with nitrogen gas for 15 minutes, measurement was performed by a single point BET method based on nitrogen gas adsorption.

The values of Ni, Mn, Co composition, true density and specific surface area are shown in Table 1.

(2) Production of Positive Electrode

90% by weight of the positive electrode active substance obtained from (1), 5% by weight of ketjen black (average particle diameter: 300 nm) as a conductive aid, 5% by weight of polyvinylidene fluoride (PVDF) as a binder, and a suitable amount of N-methyl-2-pyrrolidone (NMP) as a solvent for controlling slurry viscosity were admixed with one another to prepare a slurry of positive electrode active substance. Then, the obtained slurry of positive electrode active substance was coated on an aluminum foil (thickness: 20 μm) as a current collector and dried. After that, it was subjected to press processing to produce a positive electrode having a positive electrode active substance layer formed on a single surface.

(3) Combination of Electrolyte Solution

A solution containing 1.0 M $LiPF_6$ dissolved in a mixed solvent of ethylene carbonate (EC) and dimethyl carbonate (DMC) (volume ratio of 1:1) was prepared. Then, vinylene carbonate was added in an amount of 2% by weight to the weight of electrolyte liquid, and thus an electrolyte solution was obtained. Meanwhile, the expression "1.0 M $LiPF_6$" means that the concentration of lithium salt ($LiPF_6$) is 1.0 M in the mixture of the above mixed solvent and lithium salt.

(4) Production of Negative Electrode

A carbon negative electrode active substance in which amorphous carbon is coated on a surface of natural graphite is prepared as a negative electrode active substance, and by dispersing 96.5% by weight of a negative electrode active substance, 1.5% by weight of ammonium salt of carboxy methyl cellulose as a binder, and 2.0% by weight of styrene-butadiene copolymer latex in purified water, a slurry was prepared.

This slurry was coated on a copper foil (thickness: 10 μm) to be a negative electrode current collector, dried for 3 minutes at 120° C., and subjected to press molding using a roll press machine.

(5) Production of Laminate Cell

By alternately laminating a positive electrode plate and a negative electrode plate having an element for current collection (positive electrode 20 layers and negative electrode 21 layers), via a separator (polypropylene microporous film, thickness of 25 μm), an electrode element was produced. The electrode element thus obtained was then stored in a laminate film followed by injection of a pre-determined amount of an electrolyte solution to produce a laminate battery with a length of 280 mm, a width of 210 mm, and a thickness of 7 mm.

Examples 2 to 8, Comparative Examples 1 to 4

A laminate battery was produced in the same manner as Example 1 except that the positive electrode active substance having the Ni, Mn, Co composition ratio, true density and specific surface area shown in Table 1, which has been produced by suitably modifying the production conditions of the co-precipitation method of Example 1, was used.
[Evaluation Method]
(1) Rated Discharge Capacity (Wh) and Volume Energy Density (Wh/L)

The battery produced from each of Examples and Comparative Examples was allowed to stand for 24 hours, and once the open circuit voltage (OCV) was stabilized, charging was performed until the cut off voltage of 4.15 V with current density of 0.2 mA/cm² for a positive electrode to have an initial charge capacity. Then, the capacity at the time of having discharge to cut off voltage of 3.0 V after resting for 1 hour was used as a rated discharge capacity (Wh). Furthermore, the energy density per volume (volume energy density) was calculated based on the rated discharge capacity.
(2) Initial Charge and Discharge Efficiency (%)

In a glove box under argon atmosphere, the positive electrode obtained from each of Examples and Comparative Examples was punched to a disc shape with a diameter of 14 mm to yield a positive electrode for coin cell. As a negative electrode, metal lithium punched to a disc shape with a diameter of 15 mm was used. Furthermore, as an electrolyte solution, a solution containing 1.0 M $LiPF_6$ dissolved in a mixed solvent of ethylene carbonate (EC) and dimethyl carbonate (DMC) (volume ratio of 1:1) was prepared. The positive electrode and the negative electrode were laminated via a separator (material: polypropylene, thickness: 25 μm), added to a coin cell container, an electrolyte solution was introduced, and the coin cell container is covered with a top cover to produce a coin cell for evaluation. The produced battery was allowed to stand for 24 hours, and once the open circuit voltage (OCV) was stabilized, charging was performed until the cut off voltage of 4.25 V with current density of 0.2 mA/cm² for a positive electrode to have an initial charge capacity. Then, the capacity at the time of having discharge to cut off voltage of 3.0 V after resting for 1 hour was measured. The discharge capacity ratio relative to the initial charge capacity was used as initial charge and discharge efficiency (%).
(3) Cycle Capacity Retention Rate (%)

The battery produced in each of Examples and Comparative Examples was charged with current density of 2 mA/cm² for a positive electrode until the cut off voltage of 4.15 V to have an initial charge capacity. Then, the capacity at the time of having discharge to cut off voltage of 3.0 V after resting for 1 hour was used as an initial discharge capacity. This charge and discharge cycle was repeated 1000 times. The discharge capacity at the 1000th cycle relative to the initial discharge capacity was used as the capacity retention rate, and evaluated as cycle durability. The results are summarized in Table 1.

Example 9

(1) Production of Positive Electrode Material

To an aqueous solution (1.0 mol/L) having nickel sulfate, cobalt sulfate, and manganese sulfate dissolved therein, sodium hydroxide and ammonia were supplied to have pH of 11.0, and according to a co-precipitation method, metal composite hydroxide in which nickel, cobalt, and manganese are dissolved at the molar ratio of 1/3:1/3:1/3 was produced. The metal composite hydroxide and lithium carbonate were weighed such that the molar ratio of the total mole number of metals (Ni, Co, Mn) other than Li to the mole number of Li is 1:1 and then thoroughly mixed. The temperature was raised at the temperature increase rate of 5° C./min and calcination was performed at 920° C. for 10 hours in air atmosphere. After cooling to room temperature, $LiNi_{1/3}Mn_{1/3}Co_{1/3}$ to be a shell material was obtained.

Next, $LiNi_{1/3}Mn_{1/3}Co_{1/3}$ was admixed to have weight percentage of 5% by weight relative to 100% by weight of $LiNi_{0.50}Mn_{0.30}Co_{0.20}$ which was produced in Example 1. After the mechanical processing for 30 minutes by using a pulverizer, it was then calcined again for 10 hours at 930° C. in air atmosphere to obtain a positive electrode material in which $LiNi_{1/3}Mn_{1/3}Co_{1/3}$ was coated in an amount of 5% by weight on a surface of secondary particles of $LiNi_{0.5}Mn_{0.3}Co_{0.2}$ as a nucleus (core).

A laminate battery was produced in the same manner as Example 1 except that the aforementioned positive electrode material was used instead of the positive electrode active substance of Example 1.

Examples 10 to 13

A laminate battery was produced in the same manner as Example 9 except that the shell material having a composition described in Table 2 was used in the same manner as Example 9 and the positive electrode material was used in a shell coating amount described in Table 2.
[Evaluation Method]
(5) Exothermic Onset Temperature Differential scanning calorimetry (DSC) was performed in charged state at 4.25 V to obtain an exothermic onset temperature.

The results are shown in Table 2.

Example 14

Electrolytic manganese dioxide and aluminum hydroxide were admixed with each other and subjected to a heating treatment at 750° C. to yield manganese (III) dioxide. After that, lithium carbonate was added and mixed such that a Li/(Mn+Al) molar ratio was 0.55 followed by calcination for 20 hours at 850° C. to obtain spinel lithium manganate.

A laminate battery was produced in the same manner as Example 3 except that the positive electrode material (weight ratio of spinel lithium manganate contained in positive electrode material=0.5) of a mixture of $LiNi_{0.50}Mn_{0.30}Co_{0.20}$ which was produced in Example 3 and the spinel lithium manganate which was prepared from above (mixing weight ratio of $LiNi_{0.50}Mn_{0.30}Co_{0.20}$:spinel lithium manganate=1:1) were used instead of the positive electrode active substance of Example 3.

Examples 15 to 19

A laminate battery was produced in the same manner as Example 14 except that the positive electrode material of a mixture of $LiNi_{0.50}Mn_{0.30}Co_{0.20}$ and the spinel lithium manganate was used such that the weight ratio of the spinel lithium manganate contained in the positive electrode material was as described in Table 3.

[Evaluation Method]
(6) Low Temperature Load Characteristic

A coin cell was produced in the same manner as that described in (1) initial charge and discharge efficiency (%) of the evaluation method described above. Each coin cell was charged at upper limit voltage of 4.25 V and constant current of 0.4 mA/cm² at temperature conditions of −20° C., and constant current discharge was performed until discharge end voltage of 3.0 V. After that, constant current charge was performed for the same coin cell at current conditions of 4.0 mA/cm², and constant current discharge was performed until discharge end voltage of 3.0 V. Then, the ratio of the capacity at the time of performing charge and discharge at current conditions of 4.0 mA/cm² to the capacity at the time of performing charge and discharge at current conditions of 0.4 mA/cm² was calculated and evaluated as low temperature characteristic.

The results are shown in Table 3.

Examples 20 to 36

A laminate battery was produced in the same manner as Example 3 except that the cell size of a laminate battery of Example 3 was modified to the dimension described in Table 4.

The results are shown in Table 4.

Example 37

The metal composite oxide was prepared in the same manner as Example 1, and lithium carbonate and $ZrO_2$ were then admixed with each other such that a=1.0, b+c+d=0.009, and x=0.001 ($Li_aNi_bCo_cMn_dM_xO_2$). The temperature was raised at the temperature increase rate of 5° C./min, temporary calcination was performed at 900° C. for 2 hours in air atmosphere, the temperature was raised at the temperature increase rate of 3° C./min, and then main calcination was performed at 920° C. for 10 hours followed by cooling to room temperature.

Confirmation of the Zr addition amount was performed by ICP.

A laminate battery was produced in the same manner as Example 1 except that the composite oxide was prepared in the same manner as described above.

Examples 38 to 44

A laminate battery was produced in the same manner as Example 37 except that the composite oxide is prepared in the same manner as Example 37 such that the elements for addition and addition ratio were used as those described in Table 5.

The results are shown in Table 5.

Example 45

A laminate battery was produced in the same manner as Example 3 except that, regarding the production of a laminate cell of Example 3, a gel electrolyte was used as described below.

An electrode element was produced by laminating, via a heat resistant separator which has been coated in advance with a matrix polymer for forming gel (polyvinylidene fluoride-hexafluoropropylene copolymer), a positive electrode plate and a negative electrode plate having an element for current collection. It was then stored in a laminate film followed by injection of a pre-determined amount of an electrolyte solution and, by additional heating treatment, a laminate battery with a length of 280 mm, a width of 210 mm, and a thickness of 7 mm was obtained.

The results are shown in Table 6.

Example 46

Production of Heat Resistant Separator

95% by weight of alumina particles as inorganic particles (BET specific surface area: 5 m$^2$/g, average particle diameter: 2 μm) and 5 parts by weight of carboxymethyl cellulose as a binder (moisture content per weight of binder: 9.12% by weight) were homogenously dispersed in water to prepare an aqueous solution. The obtained aqueous solution was coated on both surfaces of a polyethylene (PP) microporous film (film thickness: 20 μm, porosity: 55%) by using a gravure coater. Then, it was dried at 60° C. to remove water, and as a result, a separator, which has a heat resistant insulating layer formed in an amount of 3.5 μm on both surfaces of a porous film and is a multilayer porous film with a total film thickness of 25 μm was produced. At that time, the weight per unit area of the heat resistant insulating layer was 15 g/m$^2$.

A laminate battery was produced in the same manner as Example 3 except that the aforementioned separator was used.

[Evaluation Method]

(7) Reliability Test

The laminate battery was kept in a high temperature layer at 150° C., and the time until the loss of the battery function was measured and the reliability test at a high temperature was performed.

The results are shown in Table 7.

TABLE 1

| | Compositional ratio of composite oxide | | | | Physical properties of positive electrode active substance | | Cell performance | | | | | |
|---|---|---|---|---|---|---|---|---|---|---|---|---|
| | | | | | True density | Specific surface area | Volume energy density | Rated discharge capacity | Rated discharge capacity | Ratio of battery area to rated capacity | Initial charge and discharge efficiency | Capacity retention rate after 1000 cycles |
| | Li:(Ni + Mn + Co) | Ni | Mn | Co | (g/cm$^3$) | (m$^2$/g) | (Wh/L) | (Wh) | (Ah) | (cm$^2$/Ah) | (%) | (%) |
| Example 1 | 1 | 5 | 3 | 2 | 4.4 | 0.3 | 365 | 148 | 41 | 15 | 89% | 83% |
| Example 2 | 1 | 5 | 3 | 2 | 4.5 | 0.45 | 365 | 148 | 41 | 15 | 89% | 84% |
| Example 3 | 1 | 5 | 3 | 2 | 4.6 | 0.4 | 369 | 150 | 41 | 14 | 90% | 87% |
| Example 4 | 1 | 5 | 3 | 2 | 4.8 | 0.5 | 361 | 146 | 40 | 15 | 87% | 90% |
| Example 5 | 1 | 1 | 1 | 1 | 4.67 | 0.43 | 365 | 148 | 41 | 15 | 89% | 88% |
| Example 6 | 1 | 6 | 2 | 2 | 4.68 | 0.53 | 361 | 146 | 40 | 15 | 88% | 84% |
| Example 7 | 1 | 42 | 42 | 16 | 4.55 | 0.63 | 353 | 143 | 39 | 15 | 86% | 90% |
| Example 8 | 1 | 8 | 1 | 1 | 4.58 | 0.4 | 361 | 146 | 40 | 15 | 88% | 78% |
| Comparative Example 1 | 1 | 5 | 3 | 2 | 4.3 | 0.2 | 337 | 137 | 38 | 16 | 85% | 64% |
| Comparative Example 2 | 1 | 5 | 3 | 2 | 4.3 | 1.2 | 322 | 130 | 36 | 17 | 85% | 64% |
| Comparative Example 3 | 1 | 5 | 3 | 2 | 4.83 | 0.2 | 307 | 125 | 34 | 17 | 85% | 63% |
| Comparative Example 4 | 1 | 5 | 3 | 2 | 4.83 | 1.2 | 293 | 119 | 33 | 18 | 85% | 65% |

*Composite oxide used in Examples 1 to 4 and Comparative Examples 1 to 4 → $LiNi_{0.5}Mn_{0.3}Co_{0.2}O_2$ Composite oxide used in Example 5 → $LiNi_{1/3}Mn_{1/3}Co_{1/3}O_2$ Composite oxide used in Example 6 → $LiNi_{0.6}Mn_{0.2}Co_{0.2}O_2$ Composite oxide used in Example 7 → $LiNi_{0.42}Mn_{0.42}Co_{0.16}O_2$ Composite oxide used in Example 8 → $LiNi_{0.8}Mn_{0.1}Co_{0.1}O_2$

TABLE 2

| | Compositional ratio of composite oxide (core) | | | | Compositional ratio of composite oxide (shell) | | | | Coating amount (wt %) | Physical properties of positive electrode material | |
|---|---|---|---|---|---|---|---|---|---|---|---|
| | Li:(Ni + Mn + Co) | Ni | Mn | Co | Li:(Ni + Mn + Co) | Ni | Mn | Co | | True density (g/cm$^3$) | Specific surface area (m$^2$/g) |
| Example 3 | 1 | 5 | 3 | 2 | 1 | 0 | 0 | 0 | 0 | 4.65 | 0.4 |
| Example 9 | 1 | 5 | 3 | 2 | 1 | 1 | 1 | 1 | 5 | 4.67 | 0.43 |
| Example 10 | 1 | 5 | 3 | 2 | 1 | 6 | 2 | 2 | 5 | 4.68 | 0.53 |
| Example 11 | 1 | 5 | 3 | 2 | 1 | 42 | 42 | 16 | 5 | 4.55 | 0.63 |
| Example 12 | 1 | 5 | 3 | 2 | 1 | 8 | 1 | 1 | 5 | 4.58 | 0.4 |
| Example 13 | 1 | 5 | 3 | 2 | 1 | 1 | 1 | 1 | 20 | 4.58 | 0.4 |

| | Cell performance | | | | | | |
|---|---|---|---|---|---|---|---|
| | Volume energy density (Wh/L) | Rated discharge capacity (Wh) | Rated discharge capacity (Ah) | Ratio of battery area to rated capacity (cm$^2$/Ah) | Initial charge and discharge efficiency (%) | Capacity retention rate after 1000 cycles (%) | Exothermic onset temperature (° C.) |
| Example 3 | 369 | 150 | 41 | 14 | 90% | 87% | 292 |
| Example 9 | 362 | 147 | 40 | 15 | 87% | 88% | 295 |
| Example 10 | 361 | 146 | 40 | 15 | 86% | 88% | 285 |
| Example 11 | 362 | 147 | 40 | 15 | 87% | 88% | 305 |
| Example 12 | 363 | 147 | 40 | 15 | 88% | 89% | 280 |
| Example 13 | 355 | 144 | 39 | 15 | 86% | 90% | 308 |

TABLE 3

| | Compositional ratio of composite oxide | | | | Weight ratio of spinel lithium manganate contained in positive electrode material | Physical properties of positive electrode material | | Cell performance | | |
|---|---|---|---|---|---|---|---|---|---|---|
| | Li:(Ni + Mn + Co) | Ni | Mn | Co | | True density (g/cm$^3$) | Specific surface area (m$^2$/g) | Volume energy density (Wh/L) | Rated discharge capacity (Wh) | Rated discharge capacity (Ah) |
| Example 3 | 1 | 5 | 3 | 2 | — | 4.65 | 0.4 | 369 | 150 | 41 |
| Example 14 | 1 | 5 | 3 | 2 | 0.5 | 4.65 | 0.4 | 336 | 136 | 36 |
| Example 15 | 1 | 5 | 3 | 2 | 0.4 | 4.67 | 0.43 | 340 | 138 | 37 |
| Example 16 | 1 | 5 | 3 | 2 | 0.3 | 4.68 | 0.53 | 343 | 139 | 37 |
| Example 17 | 1 | 5 | 3 | 2 | 0.2 | 4.55 | 0.63 | 347 | 141 | 38 |
| Example 18 | 1 | 5 | 3 | 2 | 0.1 | 4.58 | 0.4 | 351 | 142 | 39 |

TABLE 3-continued

| | | | | | | | | | | |
|---|---|---|---|---|---|---|---|---|---|---|
| Example 19 | 1 | 5 | 3 | 2 | 0.7 | 4.66 | 0.5 | 362 | 147 | 38 |

| | Cell performance | | | | |
|---|---|---|---|---|---|
| | Ratio of battery area to rated capacity (cm²/Ah) | Initial charge and discharge efficiency (%) | Capacity retention rate after 1000 cycles (%) | Initial distance to empty (km) | −20° C. Output at low temperature (%) |
| Example 3 | 14 | 90% | 87% | 257 | 63% |
| Example 14 | 16 | 90% | 80% | 234 | 68% |
| Example 15 | 16 | 93% | 84% | 236 | 67% |
| Example 16 | 16 | 92% | 85% | 239 | 66% |
| Example 17 | 15 | 91% | 86% | 241 | 65% |
| Example 18 | 15 | 90% | 86% | 244 | 64% |
| Example 19 | 15 | 95% | 75% | 252 | 72% |

TABLE 4

| | Compositional ratio of composite oxide | | | | Physical properties of positive electrode active substance | | Volume | Cell performance | | | | |
|---|---|---|---|---|---|---|---|---|---|---|---|---|
| | Li:(Ni + Mn + Co) | Ni | Mn | Co | True density (g/cm³) | Specific surface area (m²/g) | energy density (Wh/L) | Rated discharge capacity (Wh) | Rated discharge capacity (Ah) | Ratio of battery area to rated capacity (cm²/Ah) | Initial charge and discharge efficiency (%) | Capacity retention rate after 1000 cycles (%) |
| Example 3 | 1 | 5 | 3 | 2 | 4.4 | 0.3 | 365 | 148 | 41 | 15 | 89% | 88% |
| Example 20 | 1 | 5 | 3 | 2 | 4.4 | 0.3 | 352 | 135 | 37 | 16 | 89% | 88% |
| Example 21 | 1 | 5 | 3 | 2 | 4.4 | 0.3 | 343 | 121 | 33 | 18 | 89% | 88% |
| Example 22 | 1 | 5 | 3 | 2 | 4.4 | 0.3 | 333 | 108 | 30 | 20 | 89% | 88% |
| Example 23 | 1 | 5 | 3 | 2 | 4.4 | 0.3 | 320 | 94 | 26 | 23 | 89% | 88% |
| Example 24 | 1 | 5 | 3 | 2 | 4.4 | 0.3 | 313 | 87 | 24 | 25 | 89% | 88% |
| Example 25 | 1 | 5 | 3 | 2 | 4.4 | 0.3 | 305 | 81 | 22 | 26 | 89% | 88% |
| Example 26 | 1 | 5 | 3 | 2 | 4.4 | 0.3 | 296 | 74 | 20 | 29 | 89% | 88% |
| Example 27 | 1 | 5 | 3 | 2 | 4.4 | 0.3 | 286 | 67 | 18 | 32 | 89% | 88% |
| Example 28 | 1 | 5 | 3 | 2 | 4.4 | 0.3 | 275 | 61 | 17 | 35 | 89% | 88% |
| Example 29 | 1 | 5 | 3 | 2 | 4.4 | 0.3 | 262 | 54 | 15 | 40 | 89% | 88% |
| Example 30 | 1 | 5 | 3 | 2 | 4.4 | 0.3 | 246 | 47 | 13 | 46 | 89% | 88% |
| Example 31 | 1 | 5 | 3 | 2 | 4.4 | 0.3 | 229 | 40 | 11 | 54 | 89% | 88% |
| Example 32 | 1 | 5 | 3 | 2 | 4.4 | 0.3 | 208 | 34 | 9 | 63 | 89% | 88% |
| Example 33 | 1 | 5 | 3 | 2 | 4.4 | 0.3 | 183 | 27 | 7 | 79 | 89% | 88% |
| Example 34 | 1 | 5 | 3 | 2 | 4.4 | 0.3 | 153 | 20 | 5 | 107 | 89% | 88% |
| Example 35 | 1 | 5 | 3 | 2 | 4.4 | 0.3 | 114 | 13 | 4 | 165 | 89% | 88% |
| Example 36 | 1 | 5 | 3 | 2 | 4.4 | 0.3 | 65 | 7 | 2 | 307 | 89% | 88% |

| | Cell dimension | | |
|---|---|---|---|
| | Cell x dimension (mm) | Cell y dimension (mm) | Cell z dimension (mm) |
| Example 3 | 280 | 210 | 7 |
| Example 20 | 260 | 210 | 7 |
| Example 21 | 240 | 210 | 7 |
| Example 22 | 220 | 210 | 7 |
| Example 23 | 200 | 210 | 7 |
| Example 24 | 190 | 210 | 7 |
| Example 25 | 180 | 210 | 7 |
| Example 26 | 170 | 210 | 7 |
| Example 27 | 160 | 210 | 7 |
| Example 28 | 150 | 210 | 7 |
| Example 29 | 140 | 210 | 7 |
| Example 30 | 130 | 210 | 7 |
| Example 31 | 120 | 210 | 7 |
| Example 32 | 110 | 210 | 7 |

TABLE 4-continued

| | | | |
|---|---|---|---|
| Example 33 | 100 | 210 | 7 |
| Example 34 | 90 | 210 | 7 |
| Example 35 | 80 | 210 | 7 |
| Example 36 | 70 | 210 | 7 |

TABLE 5

| | Compositional ratio of composite oxide | | | | Addition of element | | Physical properties of positive electrode active substance | | Volume energy density (Wh/L) |
|---|---|---|---|---|---|---|---|---|---|
| | Li:(Ni + Mn + Co) | Ni | Mn | Co | Added element | Addition ratio (mol %) | True density (g/cm³) | Specific surface area (m²/g) | |
| Example 3 | 1 | 5 | 3 | 2 | — | — | 4.4 | 0.3 | 365 |
| Example 37 | 1 | 5 | 3 | 2 | Zr | 0.01 | 4.4 | 0.3 | 361 |
| Example 38 | 1 | 5 | 3 | 2 | Zr | 0.05 | 4.5 | 0.45 | 360 |
| Example 39 | 1 | 5 | 3 | 2 | Zr | 0.2 | 4.6 | 0.4 | 358 |
| Example 40 | 1 | 5 | 3 | 2 | Mg | 0.2 | 4.8 | 0.5 | 358 |
| Example 41 | 1 | 5 | 3 | 2 | Cr | 0.2 | 4.8 | 0.5 | 358 |
| Example 42 | 1 | 5 | 3 | 2 | P | 0.2 | 4.8 | 0.5 | 358 |
| Example 43 | 1 | 5 | 3 | 2 | Al | 0.2 | 4.8 | 0.5 | 358 |
| Example 44 | 1 | 5 | 3 | 2 | Ti | 0.2 | 4.8 | 0.5 | 358 |

| | Cell performance | | | |
|---|---|---|---|---|
| | Rated discharge capacity (Wh) | Rated discharge capacity (Ah) | Ratio of battery area to rated capacity (cm²/Ah) | Initial charge and discharge efficiency (%) | Capacity retention rate after 1000 cycles (%) |
| Example 3 | 148 | 41 | 15 | 89% | 87% |
| Example 37 | 147 | 40 | 15 | 89% | 89% |
| Example 38 | 146 | 40 | 15 | 89% | 91% |
| Example 39 | 145 | 40 | 15 | 90% | 90% |
| Example 40 | 145 | 40 | 15 | 87% | 88% |
| Example 41 | 145 | 40 | 15 | 87% | 88% |
| Example 42 | 145 | 40 | 15 | 87% | 87% |
| Example 43 | 145 | 40 | 15 | 87% | 90% |
| Example 44 | 145 | 40 | 15 | 87% | 88% |

TABLE 6

| | Compositional ratio of composite oxide | | | | Physical properties of positive electrode active substance | | Cell performance | | | | | | |
|---|---|---|---|---|---|---|---|---|---|---|---|---|---|
| | Li:(Ni + Mn + Co) | Ni | Mn | Co | True density (g/cm³) | Specific surface area (m²/g) | Initial efficiency (%) | Volume energy density (Wh/L) | Rated discharge capacity (Wh) | Rated discharge capacity (Ah) | Ratio of battery area to rated capacity (cm²/Ah) | Initial charge and discharge efficiency (%) | Capacity retention rate after 1000 cycles (%) |
| Example 3 | 1 | 5 | 3 | 2 | 4.4 | 0.3 | 89% | 365 | 148 | 41 | 15 | 89% | 87% |
| Example 45 | 1 | 5 | 3 | 2 | 4.4 | 0.3 | 86% | 363 | 147 | 40 | 15 | 86% | 88% |

TABLE 7

| | Compositional ratio of composite oxide | | | | Physical properties of positive electrode active substance | | Physical properties of separator having heat resistant insulating layer Weight per unit area of heat resistant insulating layer (g/m²) | | Cell performance Thermal shrinkage rate (%) | Volume energy density (Wh/L) |
|---|---|---|---|---|---|---|---|---|---|---|
| | Li:(Ni + Mn + Co) | Ni | Mn | Co | True density (g/cm³) | Specific surface area (m²/g) | | | | |
| Example 3 | 1 | 5 | 3 | 2 | 4.65 | 0.4 | — | | 30 | 369 |
| Example 46 | 1 | 5 | 3 | 2 | 4.65 | 0.4 | 15 | | 7 | 369 |

| | Cell performance | | | | | Reliability |
|---|---|---|---|---|---|---|
| | Rated discharge capacity (Wh) | Rated discharge capacity (Ah) | Ratio of battery area to rated capacity (cm²/Ah) | Initial charge and discharge efficiency (%) | Capacity retention rate after 1000 cycles (%) | Evaluation Time until voltage reduction of battery (minutes) |
| Example 3 | 150 | 41 | 14 | 90% | 87% | 10 |
| Example 46 | 150 | 41 | 14 | 90% | 87% | >60 |

From the results described above, it was found that the batteries of Examples 1 to 46 in which the positive electrode active substance or the positive electrode material of the present invention is used had better cycle characteristics and also higher volume energy density compared to the batteries of Comparative Examples 1 to 4.

The present application is based on Japanese Patent Application No. 2013-040109 filed on Feb. 28, 2013, and its disclosure is entirely incorporated herein by reference.

REFERENCE SIGNS LIST

1 Shell part of positive electrode material
2 Core part of positive electrode material
3 Positive electrode material
10, 50 Lithium ion secondary battery
11 Negative electrode current collector
12 Positive electrode current collector
13 Negative electrode active substance layer
15 Positive electrode active substance layer
17 Separator
19 Single battery layer
21, 57 Power generating element
25 Negative electrode current collecting plate
27 Positive electrode current collecting plate
29, 52 Battery outer casing material
58 Positive electrode tab
59 Negative electrode tab

The invention claimed is:

1. A non-aqueous electrolyte secondary battery comprising a power generating element including:
    a positive electrode for a non-aqueous electrolyte secondary battery obtained by forming, on a surface of a positive electrode current collector, a positive electrode active substance layer containing a positive electrode active substance for a non-aqueous electrolyte secondary battery that is a lithium-nickel-manganese-cobalt composite oxide and has true density of 4.40 to 4.80 g/cm³ and specific surface area of 0.30 to 1.0 m²/g;
    a negative electrode that is obtained by forming a negative electrode active substance layer on a surface of a negative electrode current collector; and
    a separator,
    wherein the ratio of a battery area to rated capacity is 5 cm²/Ah to 307 cm²/Ah and the rated capacity is 3 Ah to 41 Ah, the battery area being a projected area of a battery including an outer casing body of the battery,
    wherein the positive electrode active substance layer contains a positive electrode material for a non-aqueous electrolyte secondary battery,
    wherein the positive electrode material contains the positive electrode active substance and a spinel manganese positive electrode active substance, and
    wherein a mixing weight ratio of the positive electrode active substance to the spinel manganese positive electrode active substance is 50:50 to 90:10.

2. The non-aqueous electrolyte secondary battery according to claim 1, wherein the lithium-nickel-manganese-cobalt composite oxide is represented by General Formula: $Li_aNi_bMn_cCo_dM_xO_2$ with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$, M represents at least one selected from the group consisting of Ti, Zr, Nb, W, P, Al, Mg, V, Ca, Sr, and Cr.

3. The non-aqueous electrolyte secondary battery according to claim 2, wherein b, c and d are as follows: $0.44 \leq b \leq 0.51$, $0.27 \leq c \leq 0.31$, and $0.19 \leq d \leq 0.26$.

4. The non-aqueous electrolyte secondary battery according to claim 1, wherein
    the positive electrode material has a core part containing the positive electrode active substance and a shell part containing a lithium metal-based composite oxide different from the positive electrode active substance.

5. The non-aqueous electrolyte secondary battery according to claim 1, wherein the aspect ratio of an electrode defined as a longitudinal/transversal ratio of a rectangular positive electrode active substance layer is 1 to 3.

6. The non-aqueous electrolyte secondary battery according to claim 1, wherein the separator is a separator having a heat resistant insulating layer.

7. The non-aqueous electrolyte secondary battery according to claim 1, wherein the negative electrode active substance layer has the shape of a rectangle, and
a length of a short side of the rectangle is 100 mm to 250 mm.

* * * * *